(12) United States Patent
Luo

(10) Patent No.: US 6,301,893 B1
(45) Date of Patent: Oct. 16, 2001

(54) METHOD AND APPARATUS FOR CONVERTING NATURAL HEAT ENERGY INTO ANOTHER FORM OF ENERGY

(75) Inventor: Chin-Kuang Luo, Taichung (TW)

(73) Assignee: Orra Corporation, Santa Clara, CA (US)

( * ) Notice: Subject to any disclaimer, the term of this patent is extended or adjusted under 35 U.S.C. 154(b) by 0 days.

(21) Appl. No.: 09/693,608

(22) Filed: Oct. 20, 2000

(51) Int. Cl.[7] .............................. F01K 27/00; F03G 7/00
(52) U.S. Cl. .................. 60/641.1; 60/641.2; 60/641.8
(58) Field of Search .......................... 60/641.1, 641.2, 60/641.8, 641.15

(56) References Cited

U.S. PATENT DOCUMENTS

| 4,644,750 | * | 2/1987 | Lockett et al. ................. 60/641.2 |
| 4,781,029 | * | 11/1988 | Ser Vaas ........................... 60/649 X |
| 5,924,287 | * | 7/1999 | Best ................................ 60/641.2 X |

* cited by examiner

Primary Examiner—Hoang Nguyen
(74) Attorney, Agent, or Firm—Trop, Pruner & Hu, P.C.

(57) ABSTRACT

A method and apparatus for converting natural heat energy into another form of energy is disclosed. The method includes the steps of: (a) exposing one end of a superconductor body to a source of natural heat energy; (b) inserting another end of the superconductor body into a tank of a steam boiler that holds water therein such that the natural heat energy is transmitted by the superconductor body to the water held in the tank of the steam boiler so as to convert the water into steam; (c) providing the steam from the steam boiler to a steam turbine to produce a mechanical rotary motion; and (d) converting the mechanical rotary motion into electrical energy via use of an electric power generator that is coupled to the steam turbine.

16 Claims, 4 Drawing Sheets

METHOD AND APPARATUS FOR CONVERTING NATURAL HEAT ENERGY INTO ANOTHER FORM OF ENERGY

BACKGROUND OF THE INVENTION

1. Field of the Invention

This invention relates to a method and apparatus for converting natural heat energy into another form of energy, more particularly to a method and apparatus for transmitting natural heat energy, such as solar energy or geothermal energy, to water held in a tank of a steam boiler so as to convert the water into steam for further conversion into electrical energy.

2. Description of the Related Art while solar and geothermal apparatus are available in the art for heating water, they lack the facility to convert solar or geothermal energy into another form of energy effectively, such as electrical energy.

SUMMARY OF THE INVENTION

The object of the present invention is to provide a method and apparatus which can transmit natural heat energy for heating water held in a tank of a steam boiler so as to convert effectively the water into steam.

Another object of the present invention is to provide a method and apparatus which can convert effectively natural heat energy into electrical energy.

According to this invention, the method for converting natural heat energy into another form of energy comprises the steps of: (a) exposing one end of a superconductor body to a source of natural heat energy; (b) inserting another end of the superconductor body into a tank of a steam boiler that holds water therein, whereby the natural heat energy is transmitted by the superconductor body to the water held in the tank of the steam boiler so as to convert the water into steam; (c) providing the steam from the steam boiler to a steam turbine to produce a mechanical rotary motion; and (d) converting the mechanical rotary motion into electrical energy via use of an electric power generator that is coupled to the steam turbine.

In another aspect of this invention, the apparatus for converting natural heat energy into another form of energy includes a steam boiler with a tank that is adapted to hold water therein, and a superconductor body which has one end adapted to be exposed to a source of the natural heat energy, and another end inserted into the tank of the steam boiler. Therefore, the natural heat energy is transmitted by the superconductor body to the water held in the tank of the steam boiler so as to convert the water into steam. The apparatus further includes a steam turbine which is coupled to the steam boiler so as to receive the steam from the steam boiler and produce a mechanical rotary motion from energy of the steam. An electric power generator is coupled to the steam turbine for converting the mechanical rotary motion into electrical energy.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
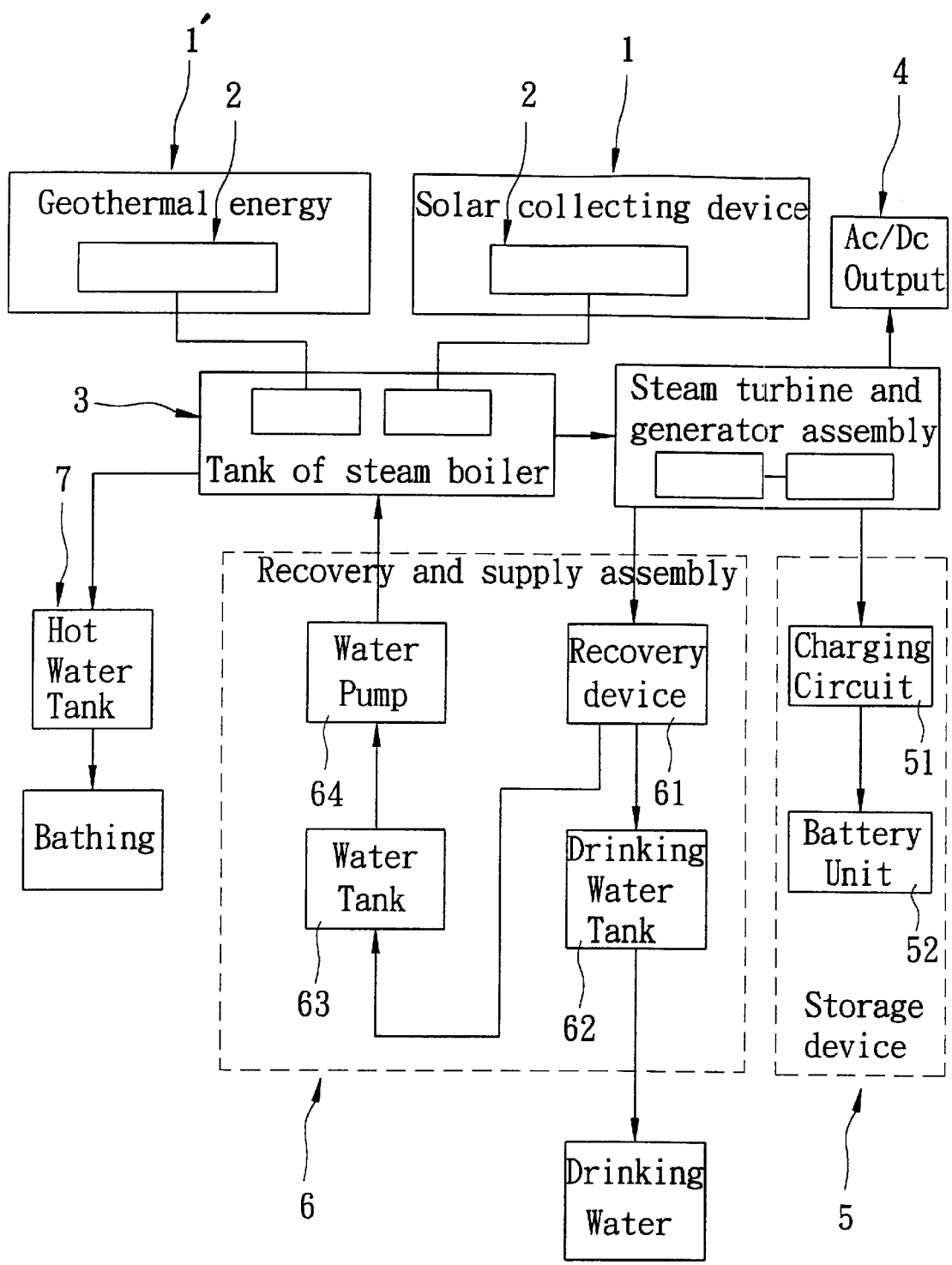
FIG. 1 is a schematic block diagram of an apparatus for converting natural heat energy into another form of energy according to this invention.

Referring to FIG. 1, the preferred embodiment of the method according to the present invention is shown to comprise the steps of:

(a) exposing one end of a superconductor body 2 to a source of natural heat energy, wherein the superconductor body 2 is a hollow body formed from an inorganic superconductor with a vacuum interior;

(b) inserting another end of the superconductor body 2 into a tank of a steam boiler 3 that holds water therein, whereby, the natural heat energy is transmitted by the superconductor body 2 to the water held in the tank of the steam boiler 3 so as to convert the water into steam;

(c) providing the steam from the steam boiler 3 to a steam turbine of a steam turbine and generator assembly 4 to produce a mechanical rotary motion; and (d) converting the mechanical rotary motion into electrical energy via use of an electric power generator of the steam turbine and generator assembly 4 that is coupled to the steam turbine. The electric power generator may be an AC generator or a DC generator. A storage device 5 can be used, and includes a battery unit 52 and a charging circuit 51 which interconnects the battery unit 52 and the electric power generator so that the battery unit 52 can be charged by the electric energy from the generator. When the AC generator is used, the generated alternating current is rectified by the charging circuit 51 prior to charging the battery unit 52. When the DC generator is used, the generated direct current is stabilized by the charging circuit 51 prior to charging the battery unit 52.

Preferably, following step (b), a steam collecting tank can be provided to collect the steam converted from the water so as to control the pressure of steam that is supplied to the steam turbine and generator assembly 4.

Figure 2:
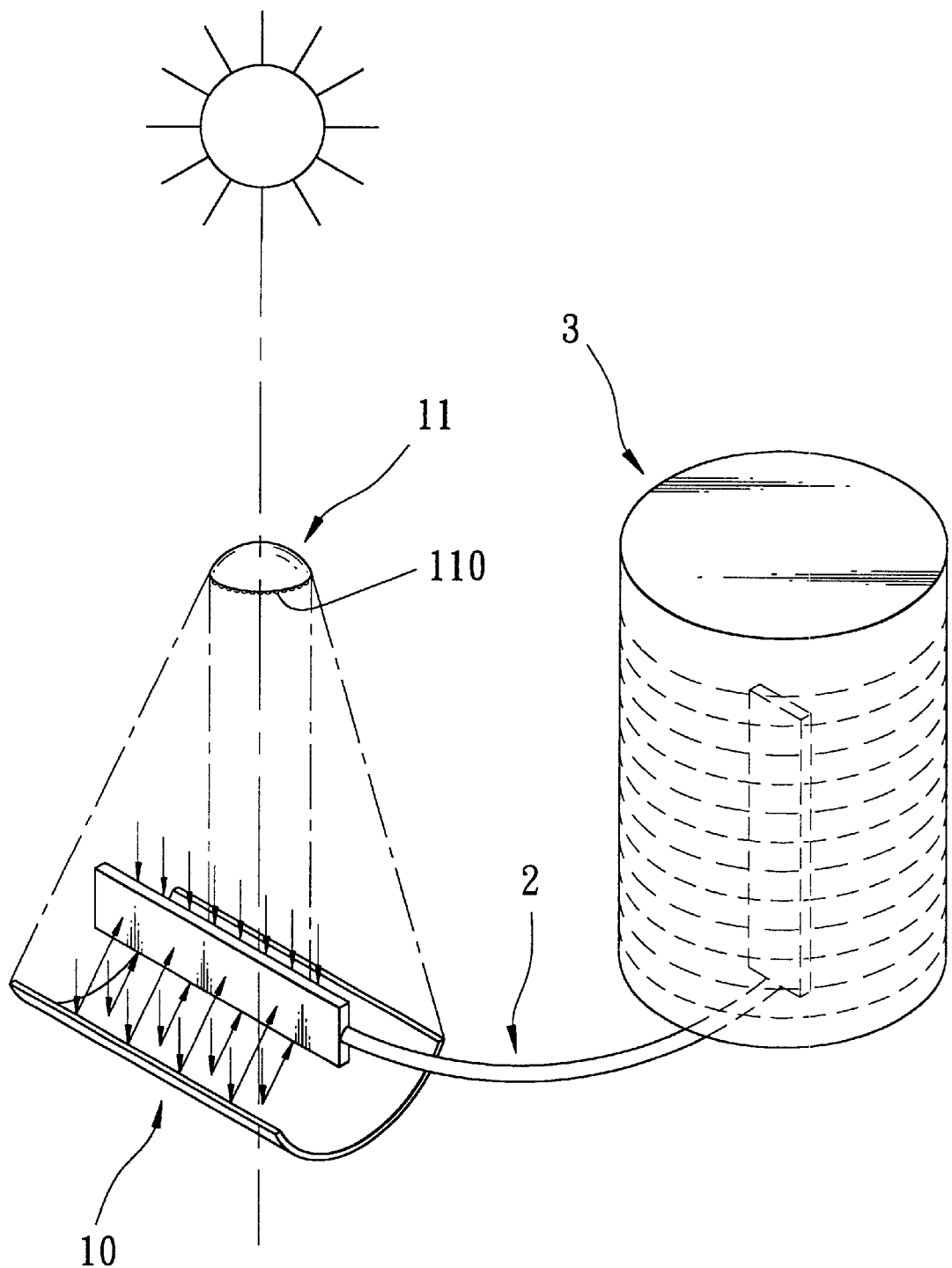
FIGS. 2 and 3 are schematic views showing one end of a superconductor body of a preferred embodiment when held in place with respect to a solar energy collecting device.
Figure 3:
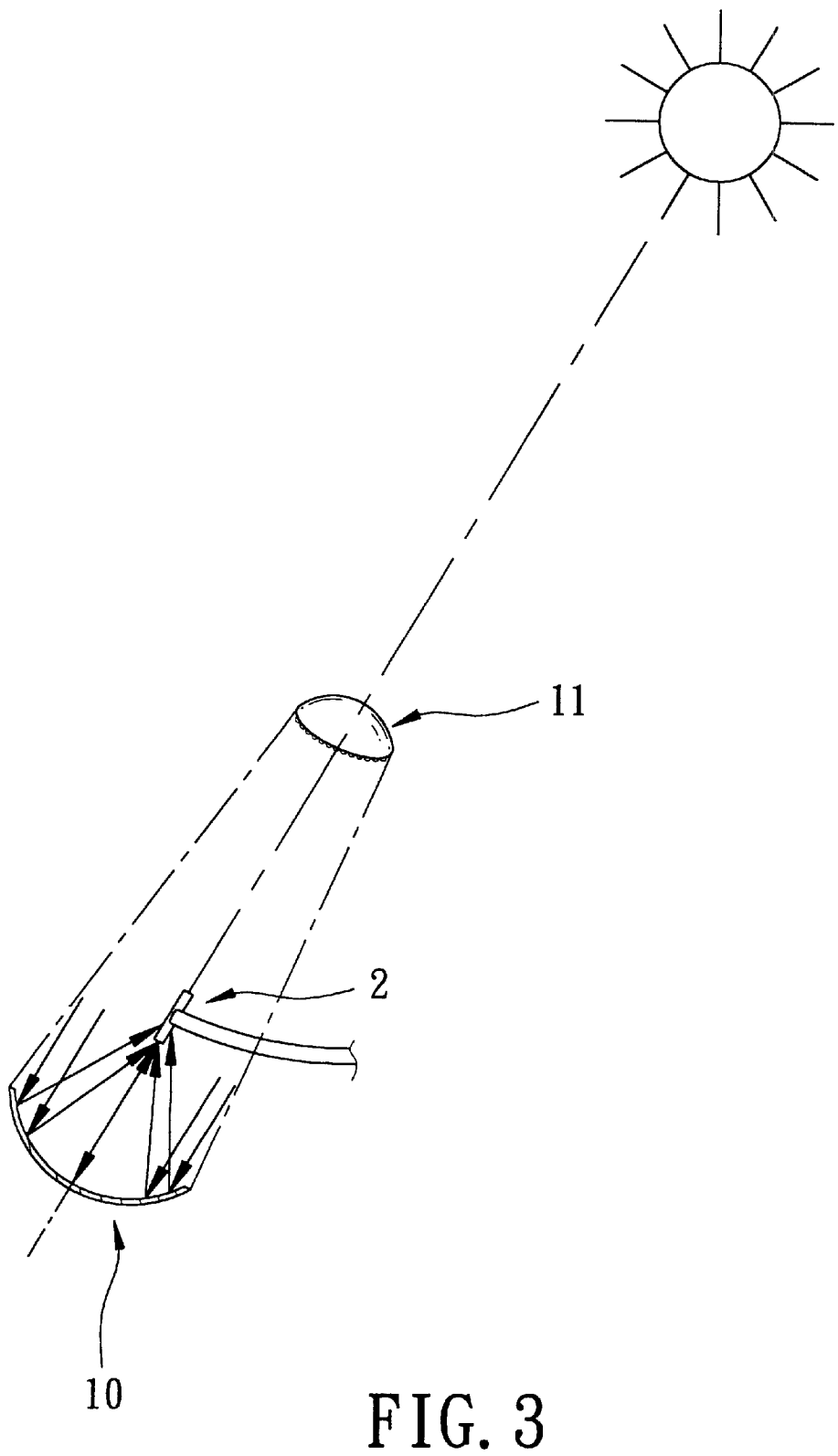

In step (a), when the natural heat energy is solar energy, one end of the superconductor body 2 is held in place with respect to a solar energy collecting device 1 that collects light energy from the sun and that directs the light energy to the end of the superconductor body 2. With reference to FIGS. 2 and 3, there are three methods for the solar energy collecting device 1 to collect light energy:

1. The superconductor body 2 is immobilized, and an arcuate collector disc 10 is moved by a circuit or servo control to maintain constant alignment with the sun.

2. The arcuate collector disc 10 and one end of the superconductor body 2 which is mounted on the arcuate collector disc 10 are immobilized, and an auto-tracking collector mirror 11 is mounted above the arcuate collector disc 10 and is aligned with the arcuate collector disc 10. The auto-tracking collector mirror 11 is rotatable to maintain constant alignment with the sun, and includes a plurality of light-spreading protrusions 110 which are disposed on the bottom thereof so as to provide a plurality of light beams to the arcuate collector disc 10 and thus to the end of the superconductor body 2. The arcuate collector disc 10 has a reflecting surface which can amplify the heat energy of the light beams projecting thereon and direct the heat energy to the end of the superconductor body 2.

3. The superconductor body 2 is immobilized, and the arcuate collector disc 10 and the collector mirror 11 are connected to each other to automatically track and collect the solar energy.

Figure 4:
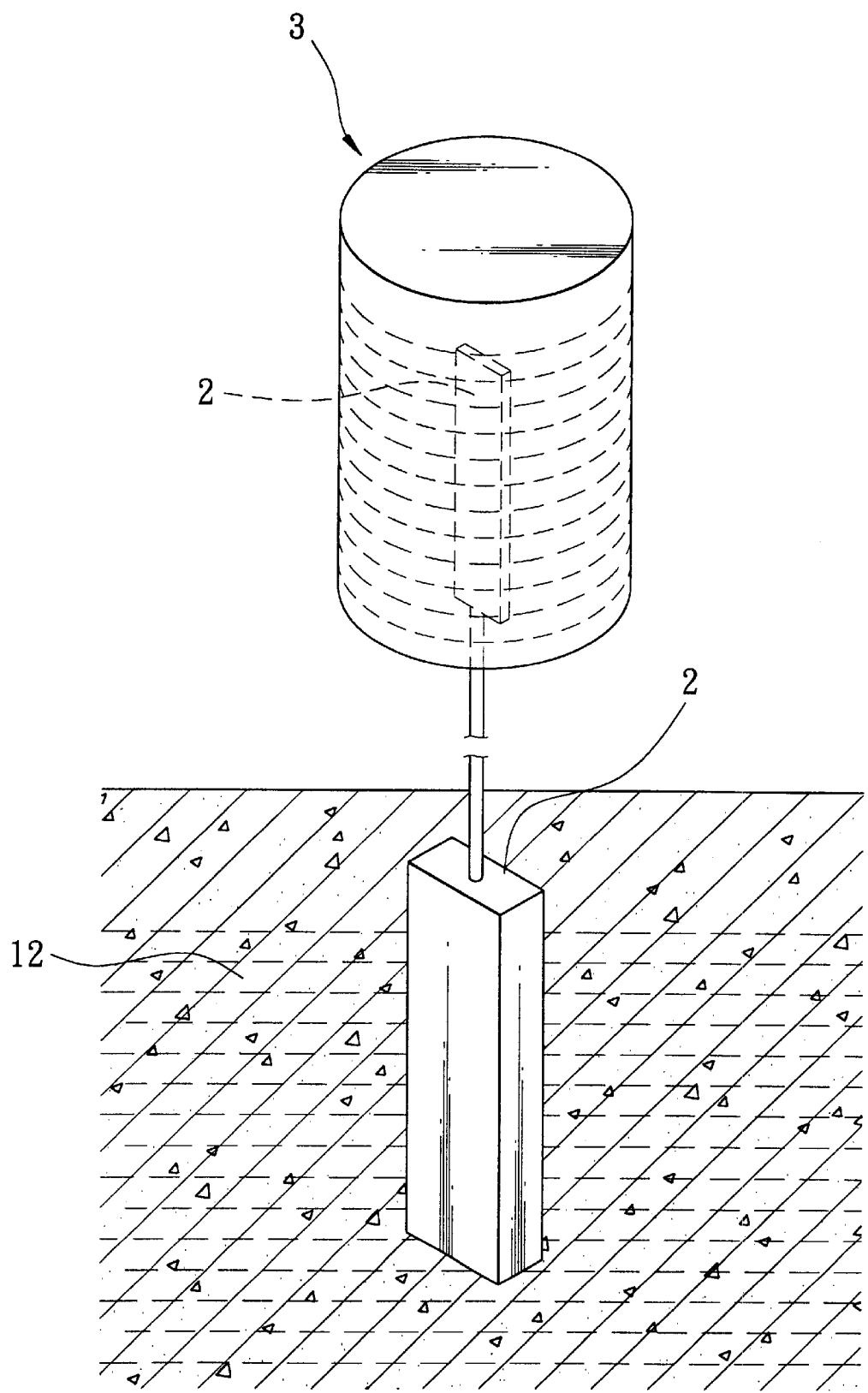
FIG. 4 is a schematic view showing one end of a superconductor body of another preferred embodiment when buried in the ground.

With reference to FIG. 4, when the natural heat energy is geothermal energy, one end of the superconductor body 2 is buried in the ground 12.

Preferably, the superconductor body 2 is covered with a metal material, such as carbon steel, that has an applicable temperature range (no change in physical state) of about −50° C. to 1700° C. and that is a non-radioactive material.

Referring again to FIG. 1, a recovery and supply assembly 6 is mounted between the tank of the steam boiler 3 and the steam turbine generator assembly 4. The recovery and supply assembly 6 includes a recovery device 61 which is coupled to the steam turbine for recovering the water from the steam via a condenser. The recovered water can be collected in a drinking water tank 62 for drinking, and in a water tank 63. A water pump 64 is coupled to the water tank 63 and the tank of the steam boiler 3 so as to pump the water from the water tank 63 to the tank of the steam boiler 3.

In addition, a hot water tank 7 can be coupled to the tank of the steam boiler 3 to collect hot water for a bathing.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A method for converting natural heat energy into another form of energy, comprising the steps of:
    (a) exposing one end of a superconductor body to a source of natural heat energy; and
    (b) inserting another end of the superconductor body into a tank of a steam boiler that holds water therein;
    whereby, the natural heat energy is transmitted by the superconductor body to the water held in the tank of the steam boiler so as to convert the water into steam.

2. The method of claim 1, wherein the natural heat energy is solar energy, and wherein, in step (a), said one end of the superconductor body is held in place with respect to a solar energy collecting device that collects light energy from the sun and that directs the light energy to said one end of the superconductor body.

3. The method of claim 1, wherein the natural heat energy is geothermal energy, and wherein, in step (a), said one end of the superconductor body is buried in the ground.

4. The method of claim 1, further comprising the steps of:
    (c) providing the steam from the steam boiler to a steam turbine to produce a mechanical rotary motion; and
    (d) converting the mechanical rotary motion into electrical energy via use of an electric power generator that is coupled to the steam turbine.

5. An apparatus for converting natural heat energy into another form of energy, comprising:
    a steam boiler having a tank that is adapted to hold water therein; and
    a superconductor body having one end adapted to be exposed to a source of the natural heat energy, and another end inserted into the tank of the steam boiler;
    whereby, the natural heat energy is transmitted by said superconductor body to the water held in said tank of said steam boiler so as to convert the water into steam.

6. The apparatus of claim 5, the natural heat energy being solar energy, further comprising a solar energy collecting device that is adapted to collect light energy from the sun, said one end of said superconductor body being held in place with respect to said solar energy collecting device such that the light energy collected by said solar energy collecting device can be directed to said one end of said superconductor body.

7. The apparatus of claim 6, wherein said solar energy collecting device is provided with an automatic tracking ability to maintain constant alignment with the sun.

8. The apparatus of claim 5, the natural heat energy being geothermal energy, wherein said one end of said superconductor body is adapted to be buried in the ground.

9. The apparatus of claim 5, further comprising:
    a steam turbine coupled to said steam boiler, said steam turbine receiving the steam from said steam boiler and producing a mechanical rotary motion from energy of the steam; and
    an electric power generator coupled to said steam turbine for converting the mechanical rotary motion into electrical energy.

10. The apparatus of claim 9, further comprising a storage device including a battery unit, and a charging circuit that interconnects said battery unit and said generator so that said battery unit can be charged by the electrical energy from said generator.

11. The apparatus of claim 5, further comprising a recovery device coupled to said steam turbine for recovering the water from the steam.

12. The apparatus of claim 11, further comprising a water tank coupled to said recovery device for collecting the water therefrom, and a water pump coupled to said water tank and said tank of said steam boiler so as to pump the water from said water tank to said tank of said steam boiler.

13. A method for heating water, comprising the steps of:
    (a) exposing one end of a superconductor body to a source of natural heat energy; and
    (b) inserting another end of the superconductor body into a container that holds the water therein;
    whereby, the natural heat energy is transmitted by the superconductor body to the water held by the container so as to heat the water.

14. The method of claim 13, wherein the natural heat energy is solar energy, and wherein, in step (a), said one end of the superconductor body is held in place with respect to a solar energy collecting device that collects light energy from the sun and that directs the light energy to said one end of the superconductor body.

15. The method of claim 13, wherein the natural heat energy is geothermal energy, and wherein, in step (a), said one end of the superconductor body is buried in the ground.

16. The method of claim 13, wherein, in step (b), the container is a tank of a steam boiler.

* * * * *